(12) United States Patent
Kim et al.

(10) Patent No.: US 7,174,727 B2
(45) Date of Patent: Feb. 13, 2007

(54) COGENERATION SYSTEM AND METHOD FOR CONTROLLING THE SAME

(75) Inventors: Cheol Min Kim, Anyang-si (KR); Cheol Soo Ko, Kunpo-si (KR); Sim Bok Ha, Seoul (KR); Baik Young Cheong, Inchun-si (KR)

(73) Assignee: LG Electronics Inc., Seoul (KR)

( * ) Notice: Subject to any disclaimer, the term of this patent is extended or adjusted under 35 U.S.C. 154(b) by 137 days.

(21) Appl. No.: 11/037,196

(22) Filed: Jan. 19, 2005

(65) Prior Publication Data
US 2006/0037342 A1    Feb. 23, 2006

(30) Foreign Application Priority Data
Aug. 17, 2004    (KR) ...................... 10-2004-0064806

(51) Int. Cl.
*F25B 27/02* (2006.01)
(52) U.S. Cl. ........................ 62/115; 62/238.7; 62/324.1
(58) Field of Classification Search ............... 62/238.7, 62/323.1, 324.1
See application file for complete search history.

(56) References Cited

U.S. PATENT DOCUMENTS

| | | | | |
|---|---|---|---|---|
| 4,697,434 A | * | 10/1987 | Yuyama | 62/238.7 |
| 5,429,179 A | * | 7/1995 | Klausing | 165/240 |
| 6,347,528 B1 | * | 2/2002 | Iritani et al. | 62/324.6 |
| 6,516,623 B1 | * | 2/2003 | Collier | 62/238.7 |
| 6,735,969 B2 | * | 5/2004 | Kasagi et al. | 62/238.7 |
| 6,769,481 B2 | * | 8/2004 | Yoshimura et al. | 165/240 |

* cited by examiner

*Primary Examiner*—William E. Tapolcai
(74) *Attorney, Agent, or Firm*—Birch, Stewart, Kolasch & Birch, LLP

(57) ABSTRACT

A cogeneration system including a pre-heater to pre-heat outdoor air blown toward the outdoor heat exchanger during a heating operation of a heat pump type air conditioner, an auxiliary evaporator to evaporate a refrigerant emerging from the outdoor heat exchanger during the heating operation of the heat pump type air conditioner, and waste heat recovering means to transfer waste heat of the engine to at least one of the pre-heater and the auxiliary evaporator. The cogeneration system exhibits a high energy efficiency.

20 Claims, 9 Drawing Sheets

COGENERATION SYSTEM AND METHOD FOR CONTROLLING THE SAME

BACKGROUND OF THE INVENTION

1. Field of the Invention

The present invention relates to a cogeneration system and a method for controlling the cogeneration system. More particularly, the present invention relates to a cogeneration system in which waste heat of an engine is recovered, and is supplied to a heat pump type air conditioner, and a method for controlling the cogeneration system.

2. Description of the Related Art

In general, cogeneration systems include an engine, a generator to generate electricity, using a rotating force outputted from the engine, and a heat transfer means to supply waste heat of the engine to a heat consumer such as a water heater or an air conditioner.

Electricity generated from the generator is used to operate various electrical devices such as electric lamps and air conditioners.

The heat transfer means recovers waste heat of cooling water used to cool the engine and waste heat of exhaust gas discharged from the engine, and supplies the recovered waste heat to the water heater or air conditioner.

However, such a conventional cogeneration system has a problem in that the waste heat of the engine is supplied to the heat consumer in an uncontrolled manner, irrespective of ambient temperature conditions, so that it is impossible to flexibly supply heat energy, taking into consideration a variation in load depending on a variation in ambient temperature.

SUMMARY OF THE INVENTION

The present invention has been made in view of the above-mentioned problems, and it is an object of the invention to provide a cogeneration system in which waste heat of an engine is used to improve the heating performance of a heat pump type air conditioner or to prevent an outdoor heat exchanger of the heat pump type air conditioner from being frosted, so that the cogeneration system exhibits a high energy efficiency.

Another object of the invention is to provide a method for controlling a cogeneration system, in which waste heat is effectively used in accordance with frost conditions of an outdoor heat exchanger included in a heat pump type air conditioner, so that it is possible to enable the cogeneration system to positively cope with ambient temperature conditions, and to maximize the heating performance of the heat pump type air conditioner.

In accordance with one aspect, the present invention provides a cogeneration system comprising: an engine; a generator connected to an output shaft of the engine to generate electricity; a heat pump type air conditioner including a compressor, a directional valve, an indoor heat exchanger, an expansion device, and an outdoor heat exchanger; a pre-heater to pre-heat outdoor air blown toward the outdoor heat exchanger during a heating operation of the heat pump type air conditioner; an auxiliary evaporator to evaporate a refrigerant emerging from the outdoor heat exchanger during the heating operation of the heat pump type air conditioner; and waste heat recovering means to transfer waste heat of the engine to at least one of the pre-heater and the auxiliary evaporator.

In accordance with another aspect, the present invention provides a cogeneration system comprising: an engine; a generator connected to an output shaft of the engine to generate electricity; a heat pump type air conditioner including a compressor, a directional valve, an indoor heat exchanger, an expansion device, and an outdoor heat exchanger; a pre-heater to pre-heat outdoor air blown toward the outdoor heat exchanger during a heating operation of the heat pump type air conditioner; an auxiliary evaporator to evaporate a refrigerant emerging from the outdoor heat exchanger during the heating operation of the heat pump type air conditioner; and waste heat recovering means to transfer waste heat of the engine to at least one of the pre-heater and the auxiliary evaporator while controlling the amount of the transferred heat in accordance with a frost condition of the outdoor heat exchanger.

The heat pump type air conditioner may use the electricity generated from the generator.

At least one of the engine, the generator, the compressor, the directional valve, the indoor heat exchanger, the expansion device, and the outdoor heat exchanger may comprise a plurality of ones.

The waste heat recovering means may comprise: an engine-cooling heat exchanger to absorb heat from cooling water used to cool the engine; an exhaust gas heat exchanger to absorb heat from exhaust gas discharged from the engine; and heat transfer means to transfer at least one of the heat of the engine-cooling heat exchanger and the heat of the exhaust gas heat exchanger to at least one of the pre-heater and the auxiliary evaporator.

The heat transfer means may comprise: a pre-heater circulation conduit to guide a heat medium to be circulated around the engine-cooling heat exchanger, the exhaust gas heat exchanger, and the pre-heater; an auxiliary evaporator circulation conduit to guide the heat medium to be circulated around the engine-cooling heat exchanger, the exhaust gas heat exchanger, and the auxiliary evaporator; and a heat medium circulation pump to pump the heat medium for circulation of the heat medium.

The heat transfer means may further comprise a control valve to control the amount of the heat medium circulated through the pre-heater circulation conduit and the auxiliary evaporator circulation conduit.

The heat transfer means may further comprise an outdoor temperature sensor to measure an outdoor temperature or a temperature of the outdoor heat exchanger. The control valve may be controlled to operate in a pre-heater circulation mode when the heat pump type air conditioner operates in a heating mode, and the temperature measured by the temperature sensor is in a heavy-frost temperature range. The control valve may also be controlled to operate in an auxiliary evaporator circulation mode when the heat pump type air conditioner operates in the heating mode, and the temperature measured by the temperature sensor is in a non-frost temperature range. The control valve may also be controlled to operate in a common mode when the heat pump type air conditioner operates in the heating mode, and the temperature measured by the temperature sensor is in a light-frost temperature range.

The cogeneration system may further comprise a radiator to discharge heat. In this case, the heat transfer means may transfer the heat of the engine-cooling heat exchanger to the radiator when the heat pump type air conditioner operates in a cooling mode.

In accordance with another aspect, the present invention provides a method for controlling a cogeneration system, comprising: a temperature measuring step of measuring an outdoor temperature or a temperature of an outdoor heat exchanger included in a heat pump type air conditioner; and a waste heat controlling step comprising steps of supplying waste heat of an engine to a pre-heater adapted to pre-heat air blown to the outdoor heat exchanger when the heat pump type air conditioner operates in a heating mode, and the temperature measured in the temperature measuring step is in a heavy-frost temperature range, supplying the waste heat of the engine to a compressor suction line heater adapted to heat a suction line of a compressor included in the heat pump type air conditioner when the heat pump type air conditioner operates in the heating mode, and the temperature measured in the temperature measuring step is in a non-frost temperature range, and supplying the waste heat of the engine to both the pre-heater and the compressor suction line heater when the heat pump type air conditioner operates in the heating mode, and the temperature measured in the temperature measuring step is in a light-frost temperature range.

The waste heat controlling step may further comprise the step of supplying, to the radiator, waste heat of cooling water used to cool the engine, which is included in the waste heat of the engine, when the heat pump type air conditioner operates in a cooling mode.

The cogeneration system according to the present invention has an advantage in that waste heat of an engine is supplied, during a heating operation of the heat pump type air conditioner, to the pre-heater arranged to pre-heat outdoor air blown toward the outdoor heat exchanger or to the auxiliary evaporator arranged to evaporate refrigerant emerging from the outdoor heat exchanger, so that the cogeneration system exhibits a high energy efficiency.

In the cogeneration system according to the present invention, the heat of exhaust gas discharged from the engine is not transferred to the radiator during a cooling operation of the heat pump type air conditioner. During a cooling operation of the heat pump type air conditioner, only the heat of cooling water used to cool the engine is transferred to the radiator so that the transferred heat is discharged from the radiator. Accordingly, there are advantages in that it is possible to minimize the size of the radiator and the amount of air blown to the radiator, and to reduce costs and noise.

In the method for controlling the cogeneration system in accordance with the present invention, waste heat is selectively transferred to the pre-heater and auxiliary evaporator in accordance with frost conditions of the outdoor heat exchanger included in the heat pump type air conditioner, so that it is possible to enable the cogeneration system to positively cope with ambient temperature conditions, and to maximize the heating performance of the heat pump type air conditioner.

BRIEF DESCRIPTION OF THE DRAWINGS

The above objects, and other features and advantages of the present invention will become more apparent after reading the following detailed description when taken in conjunction with the drawings, in which.

DESCRIPTION OF THE PREFERRED EMBODIMENTS

Hereinafter, exemplary embodiments of a cogeneration system according to the present invention will be described with reference to the annexed drawings.

Figure 1:
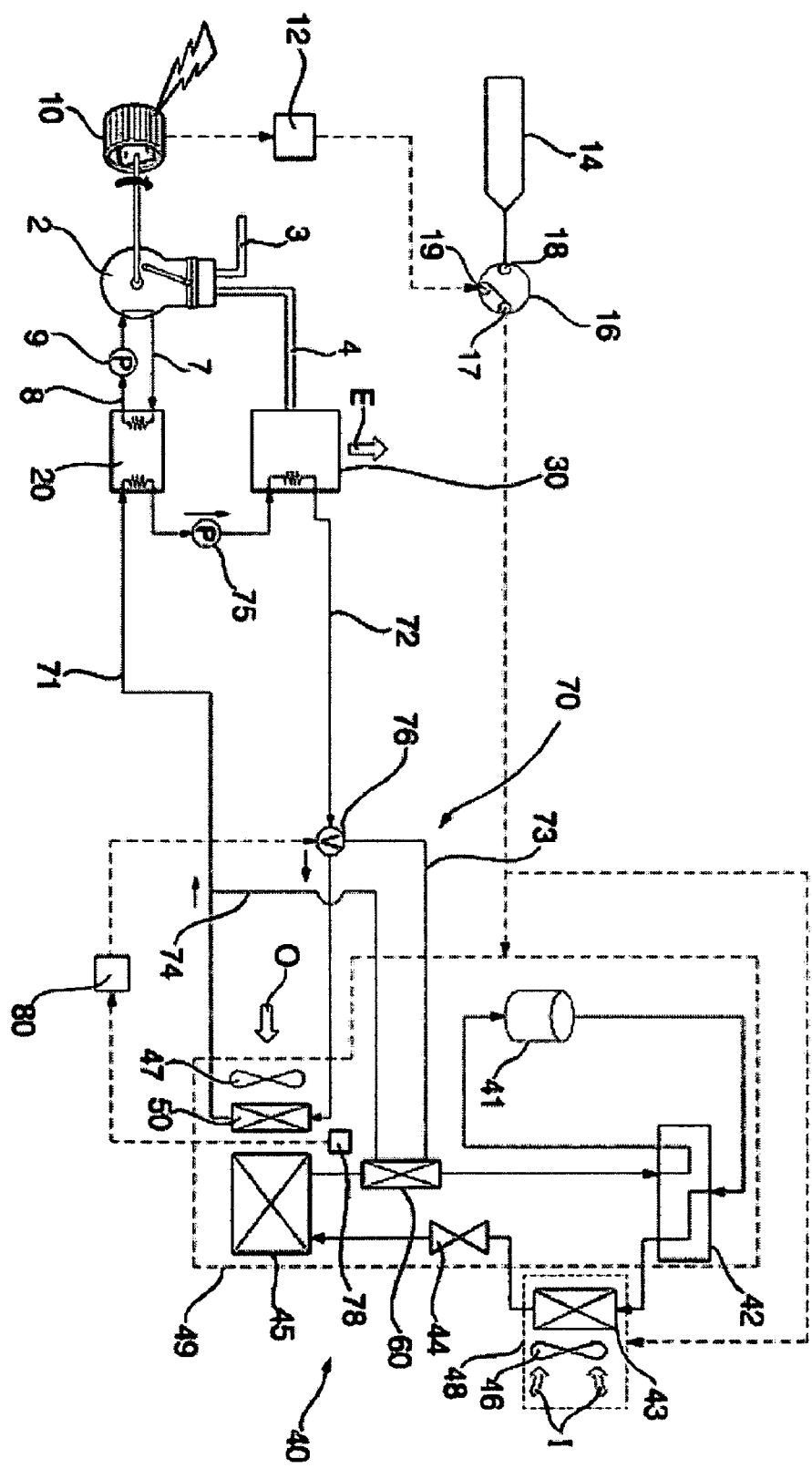
FIG. 1 is a schematic diagram of a cogeneration system according to a first embodiment of the present invention, illustrating a state in which a heat pump type air conditioner included in the cogeneration system operates in a heating mode under a heavy-frost condition.
Figure 2:
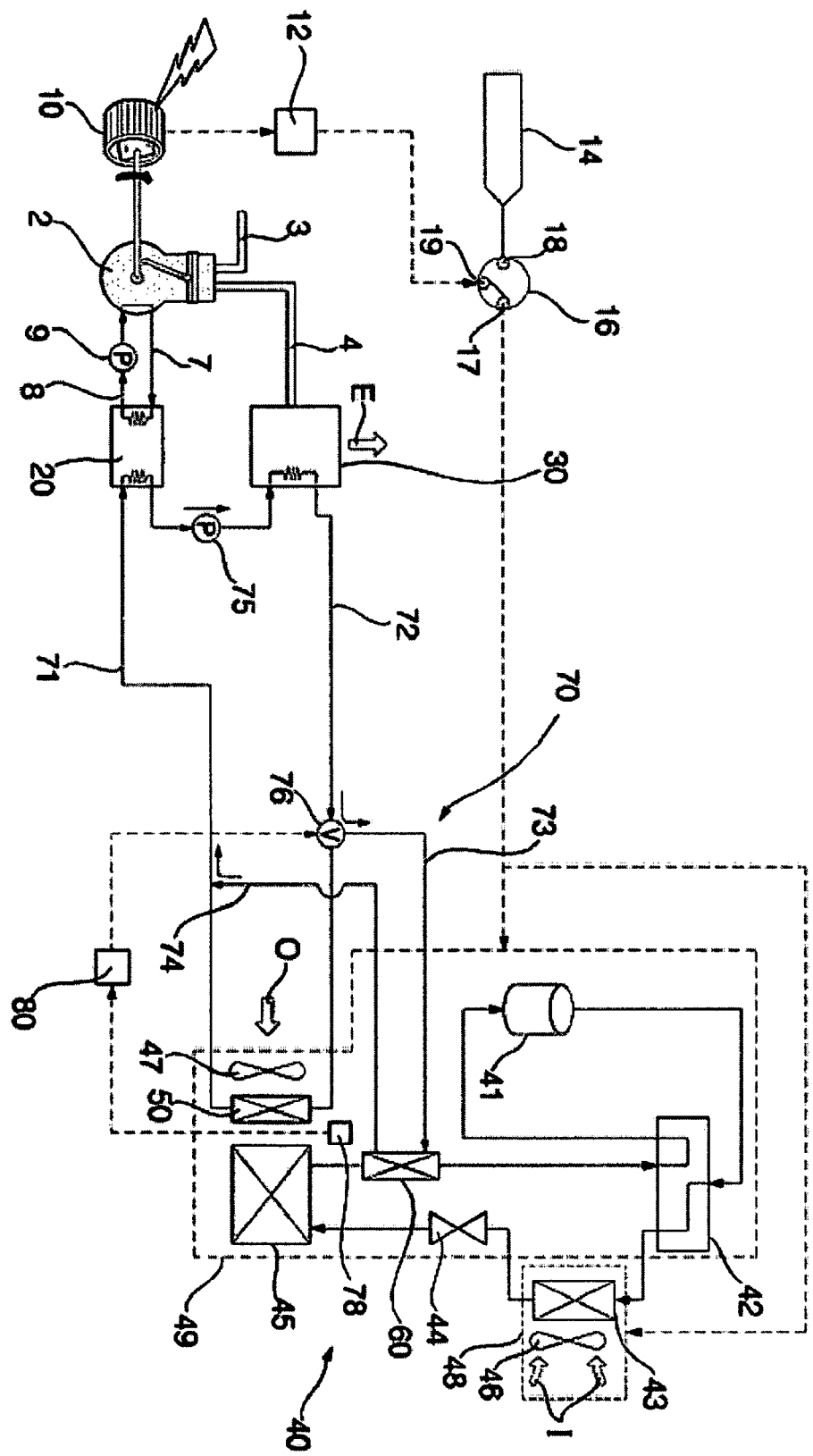
FIG. 2 is a schematic diagram of the cogeneration system according to the first embodiment of the present invention, illustrating a state in which the heat pump type air conditioner operates in the heating mode under a non-frost condition.
Figure 3:
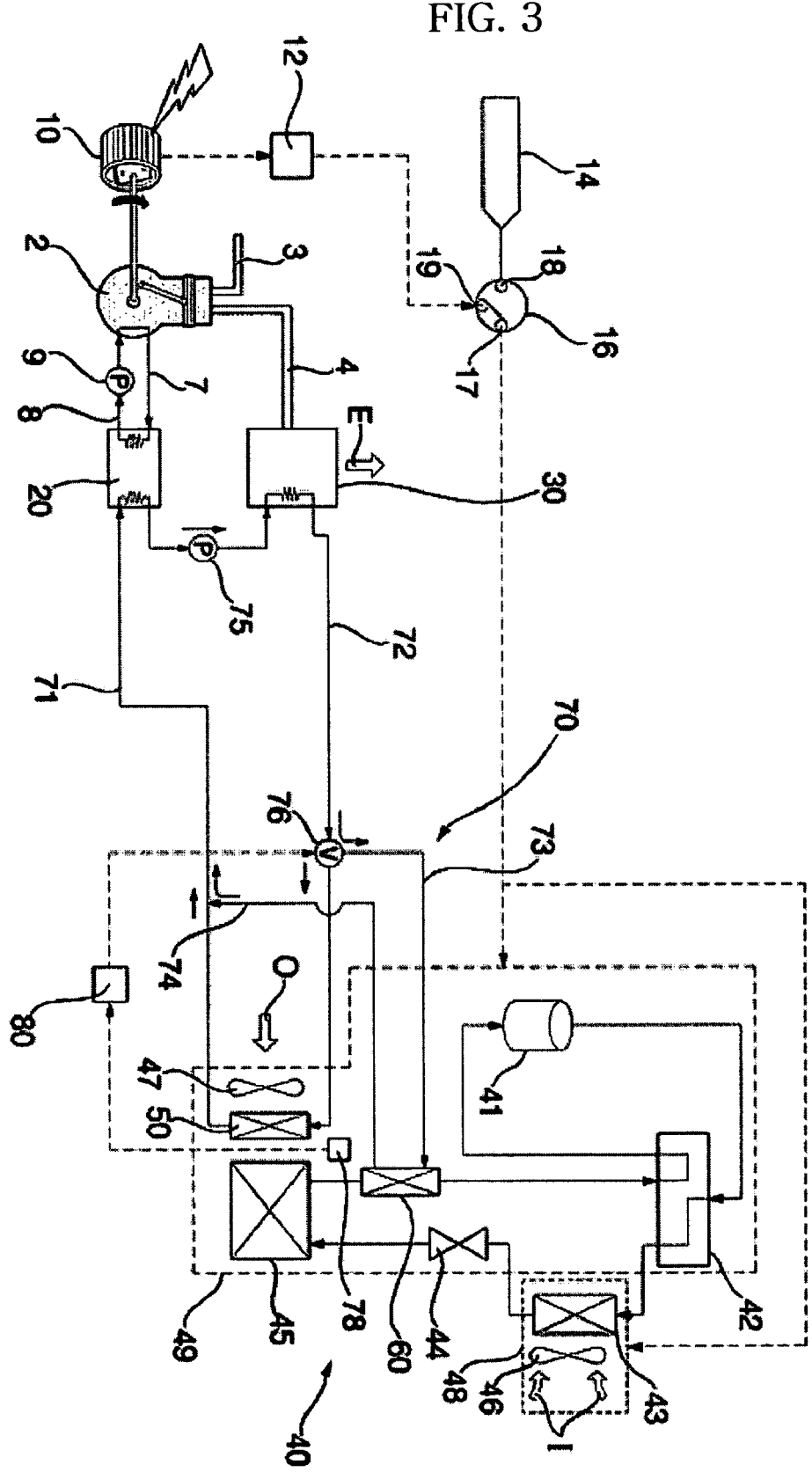
FIG. 3 is a schematic diagram of the cogeneration system according to the first embodiment of the present invention, illustrating a state in which the heat pump type air conditioner operates in the heating mode under a light-frost condition.
Figure 4:
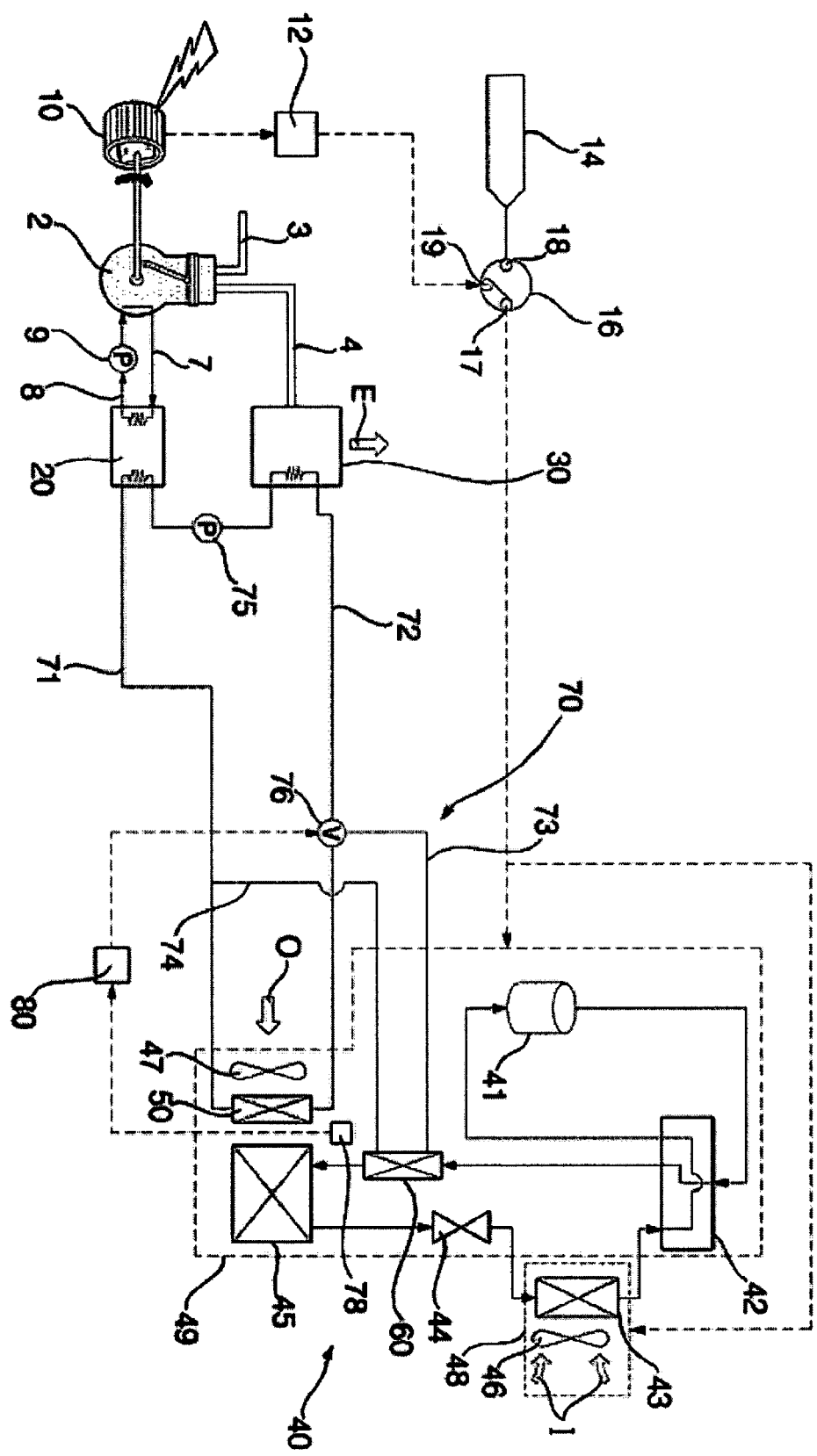
FIG. 4 is a schematic diagram of the cogeneration system according to the first embodiment of the cogeneration system, illustrating a state in which the heat pump type air conditioner operates in a cooling mode.

FIG. 1 is a schematic diagram of a cogeneration system according to a first embodiment of the present invention, illustrating a state in which a heat pump type air conditioner included in the cogeneration system operates in a heating mode under a heavy-frost condition. FIG. 2 is a schematic diagram of the cogeneration system according to the first embodiment of the present invention, illustrating a state in which the heat pump type air conditioner operates in the heating mode under a non-frost condition. FIG. 3 is a schematic diagram of the cogeneration system according to the first embodiment of the present invention, illustrating a state in which the heat pump type air conditioner operates in the heating mode under a light-frost condition. FIG. 4 is a schematic diagram of the cogeneration system according to the first embodiment of the cogeneration system, illustrating a state in which the heat pump type air conditioner operates in a cooling mode.

As shown in FIGS. 1 to 4, the cogeneration system includes an engine 2, a generator 10 connected to an output shaft of the engine 2 to generate electricity, an engine-cooling heat exchanger 20 to absorb heat from cooling water used to cool the engine 2, and an exhaust gas heat exchanger 30 to absorb heat from exhaust gas discharged from the engine 2. The cogeneration system also includes a heat pump type air conditioner 40, which includes a compressor 41, a directional valve 42, an indoor heat exchanger 43, an expansion device 44, and an outdoor heat exchanger 45. The cogeneration system further includes a pre-heater 50 to pre-heat air blown toward the outdoor heat exchanger 45 during a heating operation of the heat pump type air conditioner 40, an auxiliary evaporator 60 to evaporate a refrigerant emerging from the outdoor heat exchanger 45 during the heating operation of the heat pump type air conditioner 40, and a heat transfer means 70 to transfer heat from the engine-cooling heat exchanger 20 and heat from the exhaust gas heat exchanger 30 to at least one of the pre-heater 50 and auxiliary evaporator 60 while controlling the amount of the transferred heat in accordance with the frost condition of the outdoor heat exchanger 45.

The engine 2 includes a combustion chamber defined in the interior of the engine 2.

A fuel tube 3 and an exhaust tube 4 are connected to the engine 2. The fuel tube 3 is adapted to supply fuel such as liquefied gas or liquefied petroleum gas into the combustion chamber. The exhaust tube 4 is adapted to guide exhaust gas discharged from the combustion chamber.

The exhaust tube 4 is arranged between the engine 2 and the exhaust gas heat exchanger 30.

The engine-cooling heat exchanger 20 is connected to the engine 2 via cooling water circulation conduits 7 and 8 so that the cooling water, which is heated while cooling the engine 2, transfers heat to the engine-cooling heat exchanger 20 while passing through the engine-cooling heat exchanger 20, and is then again circulated into the engine 2.

A cooling water circulation pump 9 is connected to one of the engine 2, engine-cooling heat exchanger 20, and cooling water circulation conduits 7 and 8.

The generator 10 may be an AC generator or a DC generator.

An inverter 12 is coupled to the generator 10 to perform DC/AC conversion on electricity generated from the generator 10.

The above-described cogeneration system may be implemented to supply only the electricity generated from the generator 10 to the heat pump type air conditioner 40 or to selectively supply the electricity generated from the generator 10 or electricity supplied from an external electricity supply source 14 to the heat pump type air conditioner 40. For simplicity of description, the following description will be given only in conjunction with the case in which the electricity generated from the generator 10 or electricity supplied from an external electricity supply source 14 is selectively supplied to the heat pump type air conditioner 40.

An electricity supply switch 16 is connected to the external electricity supply source 14. The electricity supply switch 16 has an output terminal 17 connected to the heat pump type air conditioner 40 via an electricity feed line. The electricity supply switch 16 also has a first input terminal 18 connected to the external electricity supply source 14 via an electricity feed line, and a second input terminal 19 connected to the generator 10 via an electricity feed line.

When the electricity supply switch 16 is switched to an external electricity supply mode, the electricity feed lines of the external electricity supply source 14 and heat pump type air conditioner 40 are connected by the electricity supply switch 16. In this case, accordingly, the electricity from the external electricity supply source 14 is supplied to the heat pump type air conditioner 40. On the other hand, when the electricity supply switch 16 is switched to a generator electricity supply mode, the electricity supply lines of the generator 10 and heat pump type air conditioner 40 are connected by the electricity supply switch 16. In this case, accordingly, the electricity from the generator 10 is supplied to the heat pump type air conditioner 40.

For convenience of description, the following description will be given only in conjunction with the case in which the electricity generated from the generator 10 is supplied to the heat pump type air conditioner 40.

The heat pump type air conditioner 40 further includes an indoor fan 46 to blow indoor air to the indoor heat exchanger 43, and an outdoor fan 47 to blow outdoor air to the outdoor heat exchanger 45.

The indoor heat exchanger 43 and indoor fan 46 constitute an indoor unit 48 of the heat pump type air conditioner 40.

The compressor 41, directional valve 42, expansion device 44, outdoor heat exchanger 45, and outdoor fan 47 constitute an outdoor unit 49 of the heat pump type air conditioner 40.

The pre-heater 50 is arranged upstream from the outdoor heat exchanger 45 with respect to a flowing direction of outdoor air O blown toward the outdoor heat exchanger 45 such that the outdoor air O is fed to the outdoor heat exchanger 25 after being pre-heated by the pre-heater 50.

The auxiliary evaporator 60 is arranged between the outdoor heat exchanger 45 and the directional valve 42 or between the directional valve 42 or the compressor 41 such that the refrigerant, which has been evaporated while passing through the outdoor heat exchanger 45, is circulated into the compressor 41 after being re-evaporated by the auxiliary evaporator 60.

When the heat pump type air conditioner 40 operates in a heating mode, and the outdoor heat exchanger 45 is under a heavy-frost condition, the heat transfer means 70 transfers heat from the engine-cooling heat exchanger 20 and heat from the exhaust gas heat exchanger 30 to the pre-heater 50, as shown in FIG. 1. Also, when the heat pump type air conditioner 40 operates in the heating mode, and the outdoor heat exchanger 45 is under a non-frost condition, the heat transfer means 70 transfers the heat from the engine-cooling heat exchanger 20 and the heat from the exhaust gas heat exchanger 30 to the auxiliary evaporator 60, as shown in FIG. 2. On the other hand, when the heat pump type air conditioner 40 operates in the heating mode, and the outdoor heat exchanger 45 is under a light-frost condition, the heat transfer means 70 transfers heat from the engine-cooling heat exchanger 20 and heat from the exhaust gas heat exchanger 30 to the pre-heater 50 and auxiliary evaporator 60, respectively, as shown in FIG. 3.

The heat transfer means 70 includes pre-heater circulation conduits 71 and 72 to guide a heat medium to be circulated around the engine-cooling heat exchanger 20, exhaust gas heat exchanger 30, and pre-heater 50, auxiliary evaporator circulation conduits 73 and 74 to guide the heat medium to be circulated around the engine-cooling heat exchanger 20, exhaust gas heat exchanger 39, and auxiliary evaporator 60, and a heat medium circulation pump 75 to pump the heat medium for circulation of the heat medium. The heat transfer means 70 also includes a control valve 76 to control the amount of the heat transfer circulated through the pre-heater circulation conduits 71 and 72 and auxiliary evaporator circulation conduits 73 and 74, an outdoor temperature sensor 78 to measure outdoor temperature or the temperature of the outdoor heat exchanger 45, and a controller to control the control valve 76 in accordance with the outdoor temperature measured by the outdoor temperature sensor 78.

The auxiliary evaporator circulation conduits 73 and 74 are branched from the pre-heater circulation conduit 71 or 72 upstream from the pre-heater 50 such that the auxiliary evaporator circulation conduits 73 and 74 are bypassed through the auxiliary evaporator 60. The auxiliary evaporator circulation conduits 73 and 74 are joined to the pre-heater circulation conduit 71 or 72 downstream from the pre-heater 50.

The heat medium circulation pump 75 is directly connected to one of the engine-cooling heat exchanger 20, exhaust gas heat exchanger 30, and pre-heater circulation conduits 71 and 72. The following description will be given only in conjunction with the case in which the heat medium circulation pump 75 is directly connected to the pre-heater circulation conduit 71 or 72 between the engine-cooling heat exchanger 20 and the exhaust gas heat exchanger 40.

Although the control valve 76 is arranged at a branching region where the auxiliary evaporator circulation conduits 73 and 74 are branched from the pre-heater circulation conduit 71 or 72 to control the amount of the heat medium circulated through the auxiliary evaporator circulation conduits 73 and 74 or pre-heater circulation conduits 71 and 72, in the illustrated case, such control valves may be arranged at the pre-heater circulation conduits 71 and 72 and auxiliary evaporator circulation conduits 73 and 74, respectively, to control respective heat medium amounts circulated through the circulation conduits. The following description will be given only in conjunction with the case in which only one control valve 76 is arranged at a branching region where the auxiliary evaporator circulation conduits 73 and 74 are branched from the pre-heater circulation conduit 71 or 72.

The outdoor temperature sensor 78 may be mounted to the outdoor unit 49 such that the outdoor temperature sensor 78 is spaced apart from the outdoor heat exchanger 45, so as to measure the temperature of outdoor air. Alternatively, the outdoor temperature sensor 78 may be mounted to the outdoor heat exchanger 45 to measure the temperature of the outdoor heat exchanger 45. The following description will be given only in conjunction with the case in which the outdoor temperature sensor 78 is used to measure the temperature of the outdoor air.

When the heat pump type air conditioner 40 operates in the heating mode, and the temperature measured by the temperature sensor 78 is in a heavy-frost or over-frost temperature range (for example, a temperature range of −5° C. to 5° C.), the control unit 80 controls the control valve 78 to operate in a pre-heater circulation mode, as shown in FIG. 1.

When the heat pump type air conditioner 40 operates in the heating mode, and the temperature measured by the temperature sensor 78 is in a non-frost temperature range (for example, a temperature range of more than 5° C.), the control unit 80 controls the control valve 78 to operate in an auxiliary evaporator circulation mode, as shown in FIG. 2.

On the other hand, when the heat pump type air conditioner 40 operates in the heating mode, and the temperature measured by the temperature sensor 78 is in a light-frost temperature range (for example, a temperature range of less than −5° C.), the control unit 80 controls the control valve 78 to operate in a common mode, as shown in FIG. 3.

Hereinafter, operation of the cogeneration system having the above-described arrangement will be described.

When fuel is supplied into the engine 2 via the fuel tube 3, and the engine 2 is subsequently driven, the output shaft of the engine 2 is rotated, thereby causing the generator 10 to generate electricity.

Exhaust gas, which is discharged from the engine 2, is fed to the exhaust gas heat exchanger 30 via the exhaust tube 4, and is then discharged to the atmosphere after releasing its heat into the exhaust gas heat exchanger 30.

When the cooling water circulation pump 9 operates during the operation of the engine 2, the cooling water, which is heated while cooling the engine 2, is fed to the engine-cooling heat exchanger 20 via the cooling water circulation conduit 7, and is then circulated into the engine 2 via the cooling water circulation conduit 8 after releasing its heat into the engine-cooling heat exchanger 20.

Meanwhile, the temperature sensor 78 measures outdoor temperature, and outputs a signal indicative of the measured outdoor temperature to the controller 80.

When the heat pump type air conditioner 40 operates in the heating mode, and the temperature measured by the temperature sensor 78 is in a heavy-frost or over-frost temperature range (for example, a temperature range of −5° C. to 5° C.), the control unit 80 controls the control valve 78 to operate in the pre-heater circulation mode, as shown in FIG. 1. The control unit 80 also controls the heat medium circulation pump 75 to be driven, the directional valve 42 to be switched to the heating mode, and the compressor 41 to be driven.

When the control valve 78 operates in the pre-heater circulation mode, the pre-heater circulation conduits 71 and 72 are opened, and the auxiliary evaporator circulation conduits 73 and 74 are closed.

When the heat medium circulation pump 75 operates under the condition in which the pre-heater circulation conduits 71 and 72 are opened, and the auxiliary evaporator circulation conduits 73 and 74 are closed, the heat medium absorbs heat from the engine-cooling heat exchanger 20 while passing around the engine-cooling heat exchanger 20, and also absorbs heat from the exhaust gas heat exchanger 30 while passing around the exhaust gas heat exchanger 30.

After absorbing the heat of the engine-cooling heat exchanger 20 and exhaust gas heat exchanger 30, the heat medium is fed to the pre-heater 50 via the pre-heater circulation conduit 71, so that the heat medium transfers the absorbed heat to the pre-heater 50. Thereafter, the heat medium is circulated around the engine-cooling heat exchanger 20 via the pre-heater circulation conduit 72.

When the directional valve 42 is switched to a heating mode in the procedure in which the waste heat of the engine-cooling heat exchanger 20 and exhaust gas heat exchanger 30 is recovered by the heat medium, and the recovered waste heat is transferred to the pre-heater 50, and the compressor 41 operates, the compressor 41 compresses low-temperature and low-pressure refrigerant gas, thereby changing the refrigerant gas into a high-temperature and high-pressure state. The high-temperature and high-pressure refrigerant gas is fed into the indoor heat exchanger 43 via the directional valve 42, and discharges its heat into indoor air while passing through the indoor heat exchanger 43, so that the refrigerant gas is condensed into a liquid state.

Subsequently, the condensed refrigerant is expanded while passing through the expansion device 44, and is then fed into the outdoor heat exchanger 45. The expanded refrigerant absorbs heat from outdoor air O while passing through the outdoor heat exchanger 45, so that the refrigerant is evaporated.

The evaporated refrigerant passes through the auxiliary evaporator 60 without any heat exchange or any state change, and is subsequently circulated into the compressor 41 via the directional valve 42.

Meanwhile, the outdoor air O blown to the outdoor heat exchanger 45 is heated by the pre-heater 50, and then passes around the outdoor heat exchanger 45 to prevent the outdoor heat exchanger 45 from being frosted.

On the other hand, when the heat pump type air conditioner 40 operates in the heating mode, and the temperature measured by the temperature sensor 78 is in a non-frost temperature range (for example, a temperature range of more than 5° C.), the control unit 80 controls the control valve 78 to operate in an auxiliary evaporator circulation mode, as shown in FIG. 2. The control unit 80 also controls the heat medium circulation pump 75 to be driven, the directional valve 42 to be switched to the heating mode, and the compressor 41 to be driven.

When the control valve 78 operates in the auxiliary evaporator circulation mode, the pre-heater circulation conduits 71 and 72 are closed, and the auxiliary evaporator circulation conduits 73 and 74 are opened.

When the heat medium circulation pump 75 operates under the condition in which the pre-heater circulation conduits 71 and 72 are closed, and the auxiliary evaporator circulation conduits 73 and 74 are opened, the heat medium absorbs heat from the engine-cooling heat exchanger 20 while passing around the engine-cooling heat exchanger 20, and subsequently absorbs heat from the exhaust gas heat exchanger 30 while passing around the exhaust gas heat exchanger 30.

After absorbing the heat of the engine-cooling heat exchanger 20 and exhaust gas heat exchanger 30, the heat medium is fed to the auxiliary evaporator 60 via the auxiliary evaporator circulation conduit 73, so that the heat medium transfers the absorbed heat to the auxiliary evaporator 60. Thereafter, the heat medium is circulated around the engine-cooling heat exchanger 20 via the auxiliary evaporator circulation conduit 74.

When the directional valve 42 is switched to a heating mode in the procedure in which the waste heat of the engine-cooling heat exchanger 20 and exhaust gas heat exchanger 30 is recovered by the heat medium, and the recovered waste heat is transferred to the auxiliary evaporator 60, and the compressor 41 operates, the compressor 41 compresses low-temperature and low-pressure refrigerant gas, thereby changing the refrigerant gas into a high-temperature and high-pressure state. The high-temperature and high-pressure refrigerant gas is fed into the indoor heat exchanger 43 via the directional valve 42, and discharges its heat into indoor air while passing through the indoor heat exchanger 43, so that the refrigerant gas is condensed into a liquid state.

Subsequently, the condensed refrigerant is expanded while passing through the expansion device 44, and is then fed into the outdoor heat exchanger 45. The expanded refrigerant absorbs heat from outdoor air O while passing through the outdoor heat exchanger 45, so that the refrigerant is evaporated.

The evaporated refrigerant is further evaporated by the auxiliary evaporator 60 while passing through the auxiliary evaporator 60, and is subsequently introduced into the compressor 41 via the directional valve 42. Thus, circulation of the refrigerant 41 is achieved.

The refrigerant 41 introduced into the compressor 41 repeats the above-described circulation, so that the refrigerant 41 is repeatedly evaporated. As a result, it is possible to achieve an improvement in the heating performance of the indoor heat exchanger 42 and a reduction in the power consumption of the compressor 41 in accordance with the repeated evaporation of the refrigerant 41.

On the other hand, when the heat pump type air conditioner 40 operates in the heating mode, and the temperature measured by the temperature sensor 78 is in a light-frost temperature range (for example, a temperature range of less than $-5°$ C.), the control unit 80 controls the control valve 78 to operate in a common mode, as shown in FIG. 3. The control unit 80 also controls the heat medium circulation pump 75 to be driven, the directional valve 42 to be switched to the heating mode, and the compressor 41 to be driven.

When the control valve 78 operates in the common mode, both the pre-heater circulation conduits 71 and 72 and the auxiliary evaporator circulation conduits 73 and 74 are opened.

When the heat medium circulation pump 75 operates under the condition in which the pre-heater circulation conduits 71 and 72 and auxiliary evaporator circulation conduits 73 and 74 are opened, the heat medium absorbs heat from the engine-cooling heat exchanger 20 while passing around the engine-cooling heat exchanger 20, and subsequently absorbs heat from the exhaust gas heat exchanger 30 while passing around the exhaust gas heat exchanger 30.

After absorbing the heat of the engine-cooling heat exchanger 20 and exhaust gas heat exchanger 30, the heat medium is distributed into the pre-heater circulation conduits 71 and 72 and auxiliary evaporator circulation conduits 73 and 74.

Thus, a part of the heat medium is fed to the pre-heater 50 via the pre-heater circulation conduit 71, so that the heat medium transfers the absorbed heat to the pre-heater 50. Thereafter, the heat medium is circulated around the engine-cooling heat exchanger 20 via the pre-heater circulation conduit 72. The remaining part of the heat medium is fed to the auxiliary evaporator 60 via the auxiliary evaporator circulation conduit 73, so that the heat medium transfers the absorbed heat to the auxiliary evaporator 60. Thereafter, the heat medium is circulated around the engine-cooling heat exchanger 20 via the auxiliary evaporator circulation conduit 74.

That is, the waste heat of the engine-cooling heat exchanger 20 and exhaust gas heat exchanger 30 is partially used to prevent the indoor heat exchanger 45 from being frosted, and is partially used to improve the heating performance of the indoor heat exchanger 42.

Meanwhile, the controller 80 stops the heat medium circulation pump 75, irrespective of the temperature measured by the temperature sensor 78, when the heat pump type air conditioner 40 is to operate in a cooling mode. In this case, the controller 80 also switches the directional valve 42 to a cooling mode, and also operates the compressor 41.

When the directional valve 42 is switched to a cooling mode, and the compressor 41 operates, the compressor 41 compresses low-temperature and low-pressure refrigerant gas, thereby changing the refrigerant gas into a high-temperature and high-pressure state. The high-temperature and high-pressure refrigerant gas passes through the auxiliary evaporator 60 via the directional valve 42 without any heat exchange with the auxiliary evaporator 60. The refrigerant gas is then fed into the outdoor heat exchanger 45, and discharges its heat into outdoor air O while passing through the outdoor heat exchanger 45, so that the refrigerant gas is condensed into a liquid state.

Subsequently, the condensed refrigerant is expanded while passing through the expansion device 44, and is then fed into the indoor heat exchanger 43. The expanded refrigerant absorbs heat from indoor air I while passing through the indoor heat exchanger 43, so that the refrigerant is evaporated.

The evaporated refrigerant is circulated into the compressor 41 via the directional valve 42.

On the other hand, when the heat medium circulation pump 75 is in a stopped state, the heat of the engine-cooling heat exchanger 20 and exhaust gas heat exchanger 30 is discharged to the atmosphere without being transferred to the pre-heater 50 or auxiliary evaporator 60.

Figure 5:
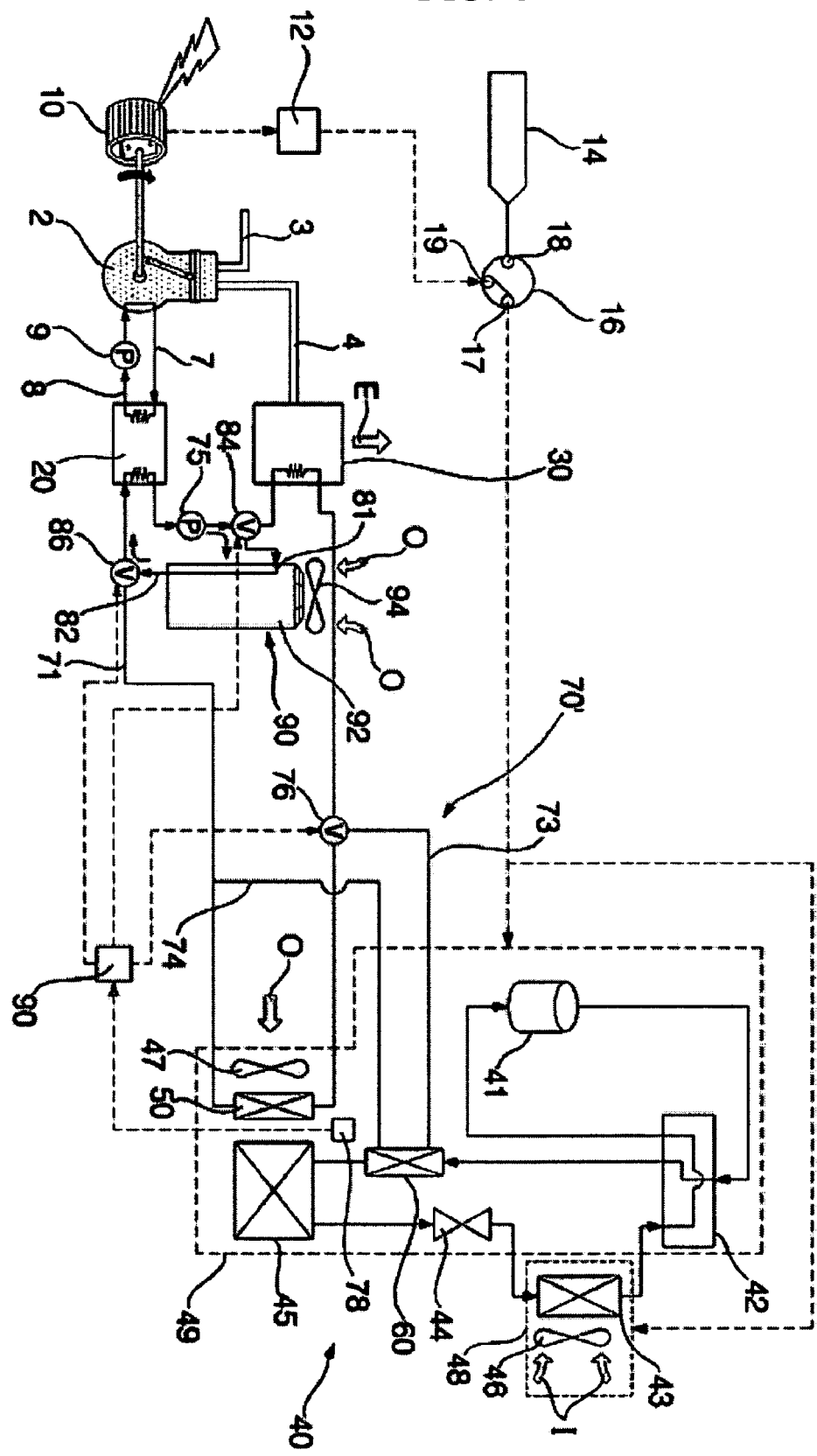
FIG. 5 is a schematic diagram of a cogeneration system according to a second embodiment of the present invention, illustrating a state in which a heat pump type air conditioner included in the cogeneration system operates in a cooling mode.

FIG. 5 is a schematic diagram of a cogeneration system according to a second embodiment of the present invention, illustrating a state in which a heat pump type air conditioner included in the cogeneration system operates in a cooling mode.

As shown in FIG. 5, the cogeneration system includes a radiator 90 to radiate heat, and a heat transfer means 70' to transfer heat from the engine-cooling heat exchanger 20 to the radiator 90 when the heat pump type air conditioner 40 operates in a cooling mode.

The radiator 90 includes a radiator heat exchanger 92 connected to the heat transfer means 70', and a radiator fan 94 to blow the outdoor air O to the radiator heat exchanger 92.

The heat transfer means 70' includes pre-heater circulation conduits 71 and 72 to guide a heat medium to be circulated around the engine-cooling heat exchanger 20, exhaust gas heat exchanger 30, and pre-heater 50, auxiliary evaporator circulation conduits 73 and 74 to guide the heat medium to be circulated around the engine-cooling heat exchanger 20, exhaust gas heat exchanger 30, and auxiliary evaporator 60, and a heat medium circulation pump 75 to pump the heat medium for circulation of the heat medium. The heat transfer means 70' also includes a control valve 76 to control the amount of the heat transfer circulated through the pre-heater circulation conduits 71 and 72 and auxiliary evaporator circulation conduits 73 and 74, an outdoor temperature sensor 78 to measure outdoor temperature or the temperature of the outdoor heat exchanger 45, radiator circulation conduits 81 and 82 bypassed from pre-heater circulation conduits 71 and 72 to guide the heat medium to be circulated around the engine-cooling heat exchanger 20 and radiator heat exchanger 92, a first valve 84 arranged at a branching region where the radiator circulation conduits 81 and 82 are branched from the pre-heater circulation conduit 71 or 72, to alternately open/close the pre-heater circulation conduits 71 and 72 and the radiator circulation conduits 81 and 82, and a second valve 86 arranged at a joining region where the radiator circulation conduits 73 and 74 are joined to the pre-heater circulation conduit 71 or 72, to alternately open/close the pre-heater circulation conduits 71 and 72 and the radiator circulation conduits 81 and 82. The heat transfer means 70' further includes a controller 80 to control the first and second valves 84 and 86 in accordance with whether the heat pump type air conditioner 40 operates in a cooling mode or in a heating mode, and to control the control valve 76 in accordance with the outdoor temperature measured by the outdoor temperature sensor 78.

The heat medium circulation pump 75 is directly connected to the pre-heater circulation conduit 71 or 72 between the engine-cooling heat exchanger 20 and the exhaust gas heat exchanger 30.

The radiator circulation conduits 81 and 82 are branched from the pre-heater circulation conduit 71 or 72 between the heat medium circulation pump 75 and the exhaust gas heat exchanger 30 such that the radiator circulation conduits 81 and 82 are bypassed around the radiator heat exchanger 92. The radiator circulation conduits 81 and 82 are joined to the pre-heater circulation conduit 71 or 72 upstream from the engine-cooling heat exchanger 20.

During a heating operation of the heat pump type air conditioner 40, the first and second valves 84 and 86 operate in a pre-heater circulation mode to open the pre-heater circulation conduits 71 and 72 and to close the radiator circulation conduits 81 and 82. During a cooling operation of the heat pump type air conditioner 40, the first and second valves 84 and 86 operate in a radiator circulation mode to close the pre-heater circulation conduits 71 and 72 and to open the radiator circulation conduits 81 and 82.

The cogeneration system of the second embodiment has the same configuration and functions as those of the first embodiment, except for the radiator 90, radiator circulation conduits 81 and 82, first valve 84 and second valve 86. Accordingly, the constituent elements of the second embodiment respectively corresponding to those of the first embodiment are designated by the same reference numerals, and no detailed description thereof will be given.

Hereinafter, operation of the cogeneration system having the above-described arrangement according to the second embodiment of the present invention will be described.

In the cooling operation of the heat pump type air conditioner 40, the heat medium circulation pump 75 is driven, and the first and second valves 84 and 86 are controlled to operate in a radiator circulation mode. Also, the radiator fan 94 is driven, the directional valve is switched to a cooling mode, and the compressor 41 is driven.

When the first and second valves 84 and 86 are controlled to operate in the radiator circulation mode, and the heat medium circulation pump 75 is driven, the heat medium absorbs heat from the engine-cooling heat exchanger 20 while passing through the engine-cooling heat exchanger 20. Subsequently, the heat medium is fed to the radiator heat exchanger 92 via the radiator circulation conduit 81.

The heat medium fed to the radiator heat exchanger 92 transfers the heat absorbed from the engine-cooling heat exchanger 20 to the radiator heat exchanger 92. The heat medium is then circulated around the engine-cooling heat exchanger 20 via the radiator circulation conduit 82.

During the operation of the radiator fan 94, outdoor air O is blown to the radiator heat exchanger 92, so that the radiator heat exchanger 92 discharges heat to the blown outdoor air O.

On the other hand, when the directional valve 42 is switched to a cooling mode, and the compressor 41 is driven, the compressor 41 compresses low-temperature and low-pressure refrigerant gas, thereby changing the refrigerant gas into a high-temperature and high-pressure state. The high-temperature and high-pressure refrigerant gas is fed into the outdoor heat exchanger 45 via the directional valve 42, and discharges its heat into outdoor air while passing through the outdoor heat exchanger 45, so that the refrigerant gas is condensed into a liquid state.

Subsequently, the condensed refrigerant is expanded while passing through the expansion device 44, and is then fed into the indoor heat exchanger 43. The expanded refrigerant absorbs heat from indoor air I while passing through the indoor heat exchanger 43, so that the refrigerant is evaporated.

The evaporated refrigerant is circulated into the compressor 41 via the directional valve 42.

Meanwhile, the exhaust gas heat exchanger 30 discharges the heat absorbed from the exhaust gas to the atmosphere.

On the other hand, in the heating operation of the heat pump type air conditioner 40, the heat medium circulation pump 75 is driven, and the first and second valves 84 and 86 are controlled to operate in a pre-heater circulation mode. Also, the directional valve is switched to a heating mode, the compressor 41 is driven, and the control valve 76 is controlled to operate in a pre-heater circulation mode, an auxiliary evaporator circulation mode, or a common mode in accordance with the outdoor temperature measured by the temperature sensor 78 or the temperature of the outdoor heat exchanger 45.

When the first and second valves 84 and 86 are controlled to operate in the pre-heater circulation mode, and the heat medium circulation pump 75 is driven, the heat medium absorbs heat from the engine-cooling heat exchanger 20 while passing through the engine-cooling heat exchanger 20. Subsequently, the heat medium also absorbs heat from the exhaust gas heat exchanger 30 while passing through the exhaust gas heat exchanger 30.

The heat medium, which has absorbed the heat of the engine-cooling heat exchanger 20 and exhaust gas heat exchanger 30, transfers the absorbed heat only to the pre-heater 50, only to the auxiliary evaporator 60, or to both the pre-heater 50 and the auxiliary evaporator 60.

The switching operation of the directional valve 42 to the heating mode, the operation of the compressor 41, and the control operation of the control valve 76 are the same as those of the first embodiment, so that no detailed description thereof will be given.

Figure 6:
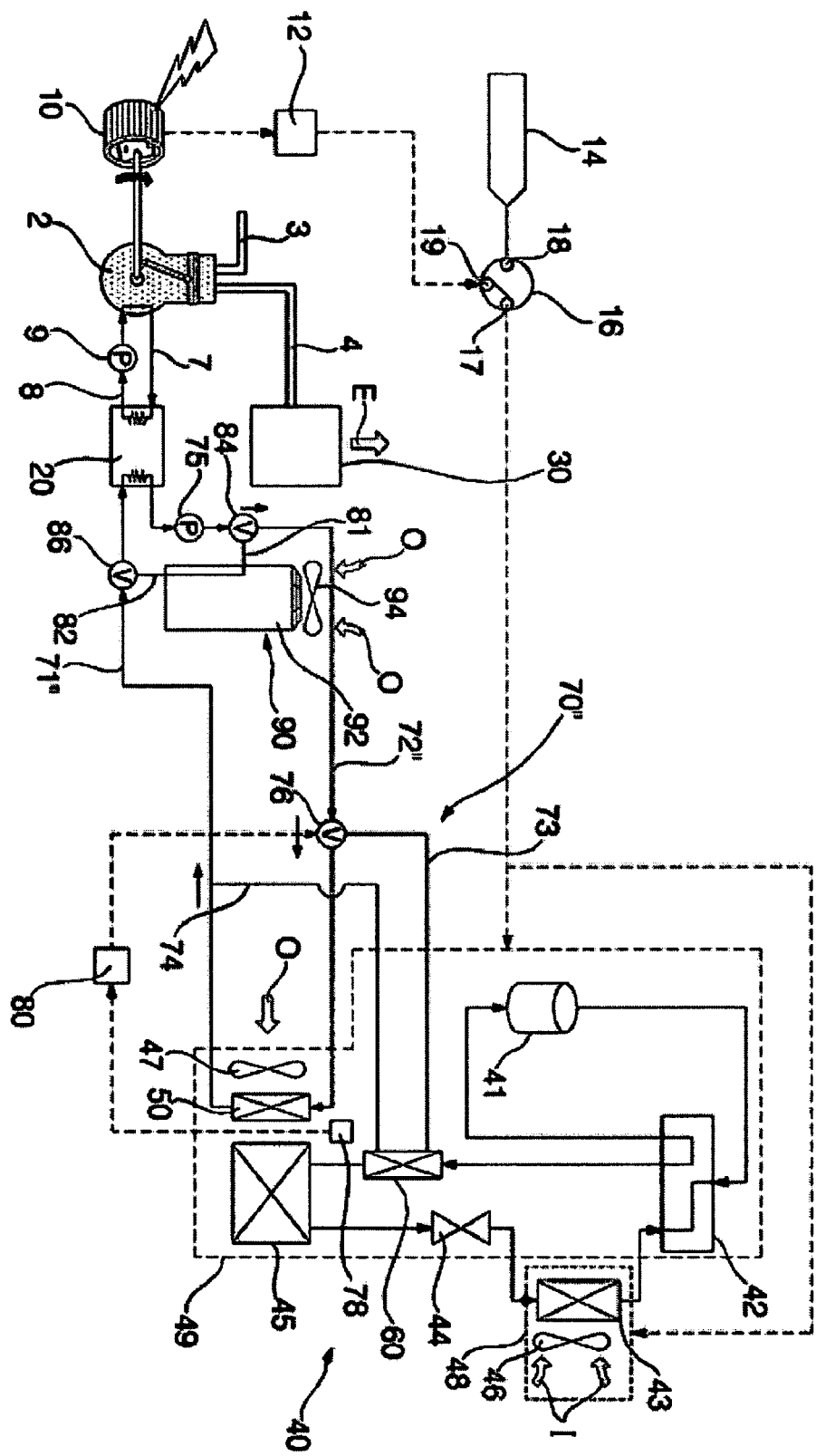
FIG. 6 is a schematic diagram of a cogeneration system according to a third embodiment of the present invention.

FIG. 6 is a schematic diagram of a cogeneration system according to a third embodiment of the present invention.

As shown in FIG. 6, the cogeneration system includes a heat transfer means 70" to transfer only the heat of the engine-cooling heat exchanger 20 to the pre-heater 50 or to the auxiliary evaporator 60 during a heating operation of the heat pump type air conditioner 40.

The heat transfer means 70" includes pre-heater circulation conduits 71" and 72", which connect the engine-cooling heat exchanger 20 and the pre-heater 50 to guide a heat medium to be circulated around the engine-cooling heat exchanger 20 and pre-heater 50 without passing around the exhaust gas heat exchanger 30.

The cogeneration system of the third embodiment has the same configuration and functions as those of the first embodiment or second embodiment, except for the pre-heater circulation conduits 71" and 72". Accordingly, the constituent elements of the third embodiment respectively corresponding to those of the first embodiment or second embodiment are designated by the same reference numerals, and no detailed description thereof will be given.

The heat of the exhaust gas heat exchanger 30 is discharged to the atmosphere without being transferred to the pre-heater 50 or auxiliary evaporator 60.

Figure 7:
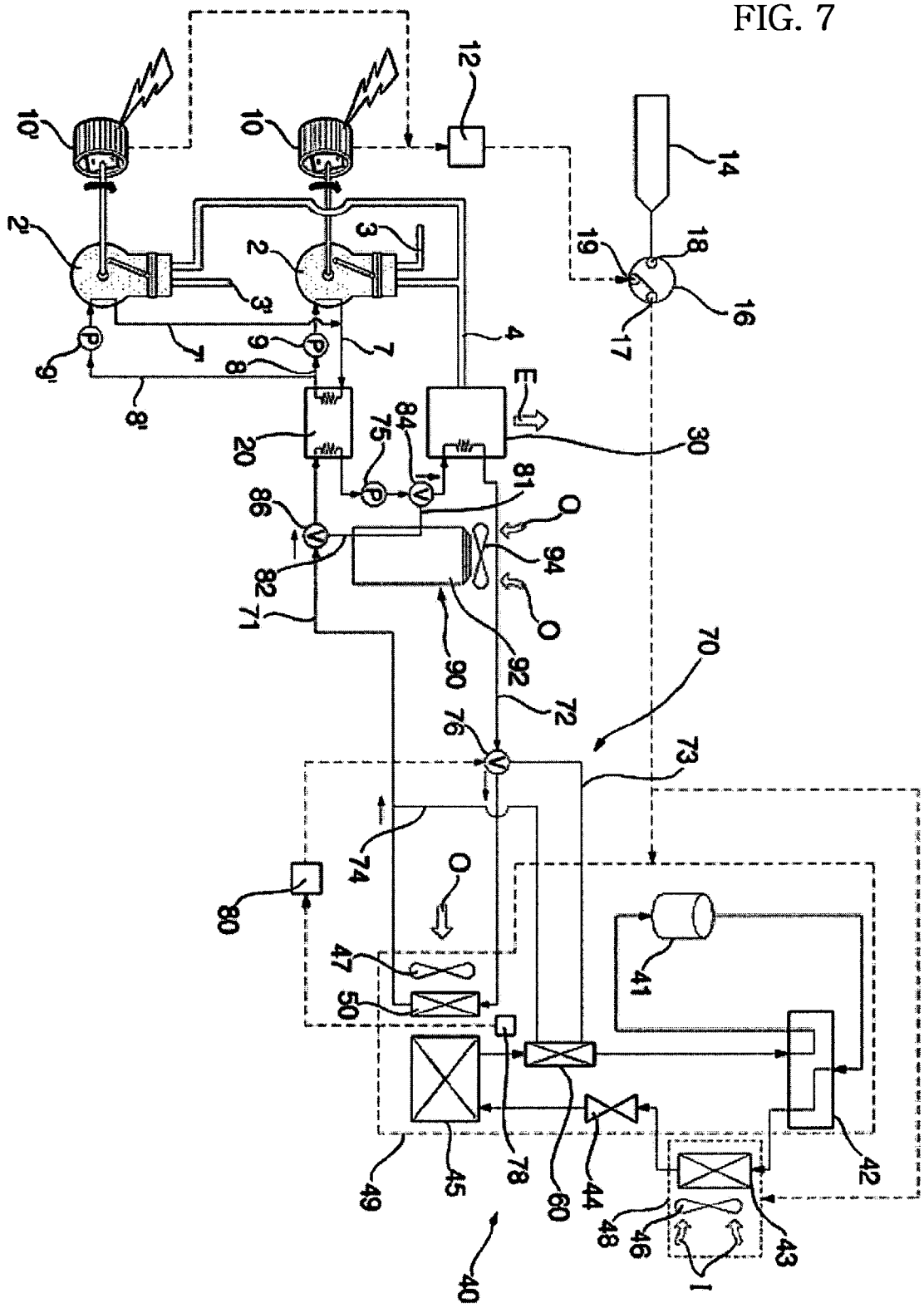
FIG. 7 is a schematic diagram of a cogeneration system according to a fourth embodiment of the present invention.

FIG. 7 is a schematic diagram of a cogeneration system according to a fourth embodiment of the present invention.

As shown in FIG. 7, the cogeneration system includes a plurality of engines 2, 2' . . . . The cogeneration system also includes a plurality of generators 10, 10' . . . connected to respective shafts of the engines 2, 2' . . . . The cogeneration system of the fourth embodiment has the same configuration and functions as those of any one of the first through third embodiments, except for the engines 2, 2' . . . and generators 10, 10' . . . . Accordingly, the constituent elements of the fourth embodiment respectively corresponding to those of any one of the first through third embodiments are designated by the same reference numerals, and no detailed description thereof will be given.

One or more of the engines 2, 2' . . . operate in accordance with the load to be cooled or heated.

Fuel tubes 3, 3' . . . are connected to respective engines 2, 2' . . . . Also, pairs of cooling water circulation conduits 7 and 8, 7' and 8' . . . are connected to respective engines 2, 2' . . . .

Exhaust gas tubes 4, 4' . . . are connected in parallel.

The cooling water circulation conduits 7 and 8, 7' and 8' . . . are connected in parallel.

Cooling water circulation pumps 9, 9' . . . are directly connected to the cooling water circulation conduit 7 or 8, cooling water circulation conduit 7' or 8' . . . , respectively.

The cogeneration system of the fourth embodiment has the same configuration and functions as those of any one of the first through third embodiments, except that a plurality of engines 2, 2' . . . , a plurality of fuel tubes 3, 3' . . . , a plurality of exhaust gas tubes 4, 4' . . . , a plurality of cooling water circulation conduits 7, 8, 7', 8' . . . , and a plurality of generators 10, 10' . . . are used. Accordingly, the constituent elements of the fourth embodiment respectively corresponding to those of any one of the first through third embodiments are designated by the same reference numerals, and no detailed description thereof will be given.

Figure 8:
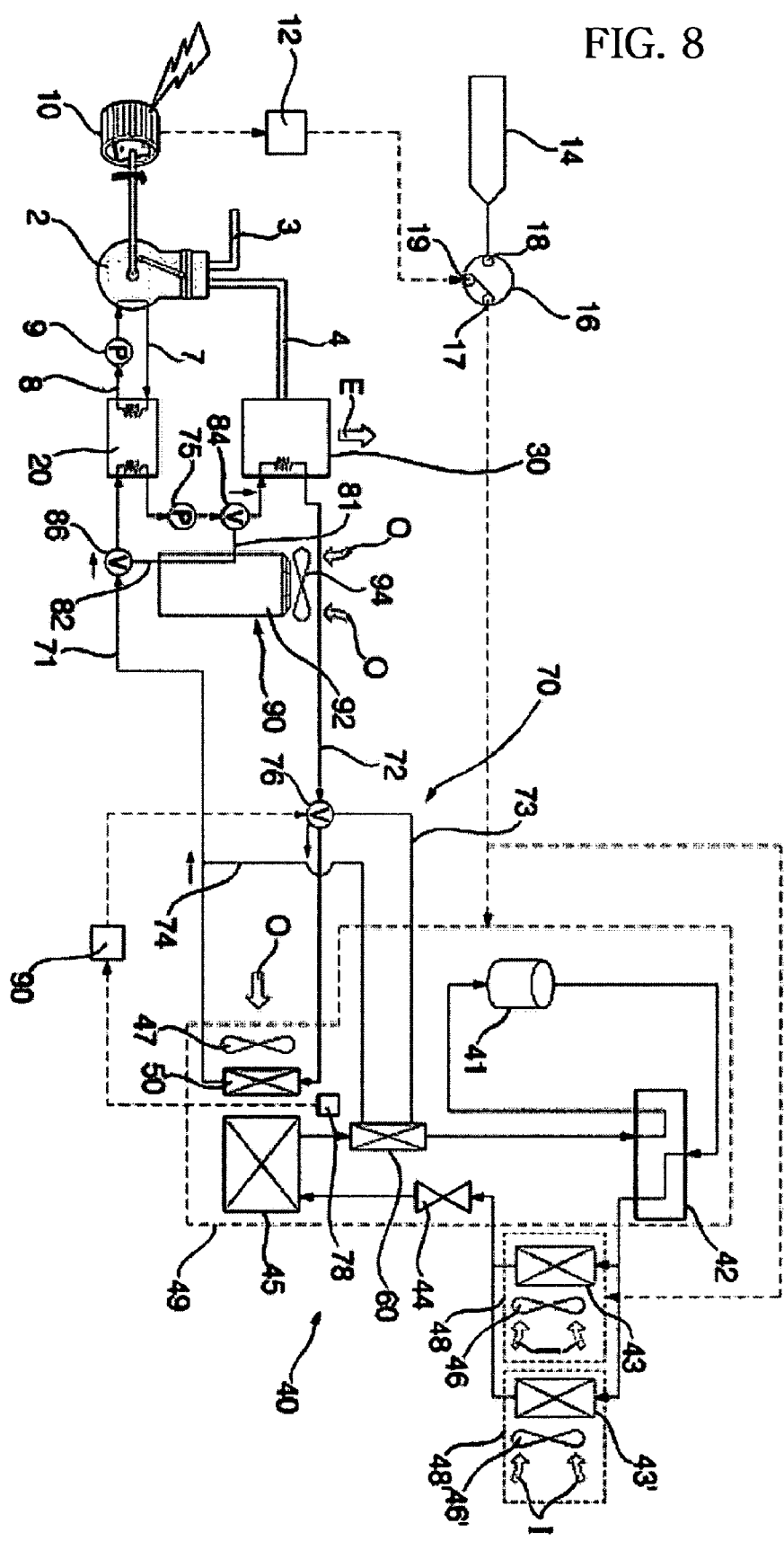
FIG. 8 is a schematic diagram of a cogeneration system according to a fifth embodiment of the present invention.

FIG. 8 is a schematic diagram of a cogeneration system according to a fifth embodiment of the present invention.

As shown in FIG. 8, the heat pump type air conditioner, that is, the heat pump type air conditioner 40, which is included in the cogeneration system, is of a multi-type. That is, the heat pump type air conditioner 40 includes a plurality of indoor units 48, 48' . . . , and a single outdoor unit 49. The indoor units 48, 48' . . . include indoor heat exchangers 43, 43' . . . , which are connected in parallel, respectively.

The indoor units 48, 48' . . . also include indoor blowers 46, 46' . . . , respectively.

The cogeneration system of this embodiment has the same configuration and functions as those of any one of the first through fourth embodiments, except that the heat pump type air conditioner 40 includes a plurality of indoor units 48, 48' . . . , and thus, a plurality of indoor heat exchangers 43, 43' . . . . Accordingly, the constituent elements of the fifth embodiment respectively corresponding to those of any one of the first through fourth embodiments are designated by the same reference numerals, and no detailed description thereof will be given.

Figure 9:
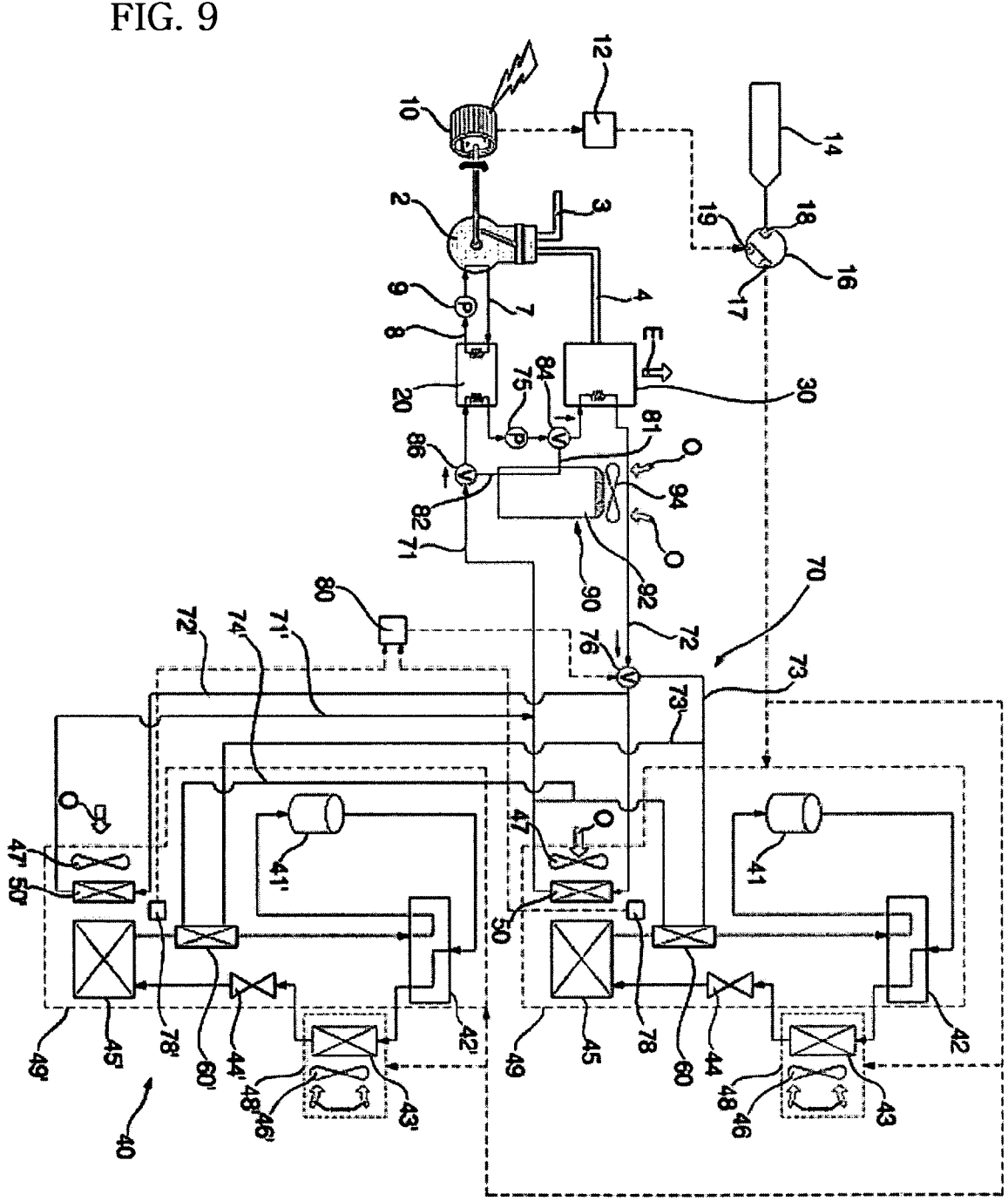
FIG. 9 is a schematic diagram of a cogeneration system according to a sixth embodiment of the present invention.

FIG. 9 is a schematic diagram of a cogeneration system according to a sixth embodiment of the present invention.

As shown in FIG. 9, the heat pump type air conditioner, that is, the heat pump type air conditioner 40, which is included in the cogeneration system, includes a plurality of indoor units 48, 48' . . . , and a plurality of outdoor units 49, 49' . . . .

In the heat pump type air conditioner 40, refrigerant conduits respectively included in the indoor units 48, 48' . . . may be connected in parallel. Refrigerant conduits respectively included in the outdoor units 49, 49' . . . may also be connected in parallel. The following description will be given in conjunction with the case in which each of the outdoor units 49, 49' . . . are connected to an associated one of the indoor units 48, 48' . . . to constitute one air conditioner set, and each air conditioner set operates independently of other air conditioner sets.

The indoor units 48, 48' . . . include respective indoor heat exchangers 43, 43' . . . , and respective indoor blowers 46, 46' . . . .

The outdoor units 49, 49' . . . include respective compressors 41, 41' . . . , directional valves 42, 42' . . . , respective expansion devices 44, 44' . . . , respective outdoor heat exchangers 45, 45' . . . , and respective outdoor blowers 47, 47' . . . . The outdoor units 49, 49' . . . also include pre-heaters 50, 50' . . . , auxiliary evaporators 60, 60' . . . , and temperature sensors 78, 78' . . . , respectively.

Each of the pre-heaters 50, 50' . . . are arranged upstream from an associated one of the outdoor heat exchangers 45, 45' . . . .

Pairs of pre-heater circulation conduits 71 and 72, 71' and 72' . . . , which are connected in parallel, are connected to respective pre-heaters 50, 50' . . . . to guide a heat medium to be circulated around the pre-heaters 50, 50' . . . .

Each of the auxiliary evaporators 60, 60' . . . may be arranged between an associated one of the outdoor heat exchangers 45, 45' . . . and an associated one of the directional valves 42, 42' . . . , or may be arranged between the associated one of the directional valves 42, 42' . . . and an associated one of the compressors 41, 41' . . . .

Pairs of auxiliary evaporator circulation conduits 73 and 74, 73' and 74' . . . , which are connected in parallel, are connected to respective auxiliary evaporators 60, 60' . . . to guide a heat medium to be circulated around the auxiliary evaporators 60, 60' . . . .

The cogeneration system of this embodiment has the same configuration and functions as those of any one of the first through fifth embodiments, except that the heat pump type air conditioner 40 includes a plurality of indoor units 48, 48' . . . , a plurality of outdoor units 49, 49' . . . , a plurality of pre-heaters 50, 50' . . . , a plurality of pre-heater circulation conduits 71, 72, 71', 72' . . . , a plurality of auxiliary evaporators 60, 60' . . . , and a plurality of auxiliary evaporator circulation conduits 73, 74, 73', 74' . . . . Accordingly, the constituent elements of the sixth embodiment respectively corresponding to those of any one of the first through fifth embodiments are designated by the same reference numerals, and no detailed description thereof will be given.

The cogeneration system according to any one of the above-described embodiments of the present invention has various effects.

That is, the cogeneration system according to the present invention has an advantage in that waste heat of an engine is supplied, during a heating operation of the heat pump type air conditioner, to the pre-heater arranged to pre-heat outdoor air blown toward the outdoor heat exchanger or to the auxiliary evaporator arranged to evaporate refrigerant emerging from the outdoor heat exchanger, so that the cogeneration system exhibits a high energy efficiency.

In the cogeneration system according to the present invention, the heat of exhaust gas discharged from the engine is not transferred to the radiator during a cooling operation of the heat pump type air conditioner. During a cooling operation of the heat pump type air conditioner, only the heat of cooling water used to cool the engine is transferred to the radiator so that the transferred heat is discharged from the radiator. Accordingly, there are advantages in that it is possible to minimize the size of the radiator and the amount of air blown to the radiator, and to reduce costs and noise.

In the method for controlling the cogeneration system in accordance with the present invention, waste heat is selectively transferred to the pre-heater and auxiliary evaporator in accordance with frost conditions of the outdoor heat exchanger included in the heat pump type air conditioner, so that it is possible to enable the cogeneration system to positively cope with ambient temperature conditions, and to maximize the heating performance of the heat pump type air conditioner.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A cogeneration system comprising:
    an engine;
    a generator connected to an output shaft of the engine to generate electricity;
    a heat pump type air conditioner including a compressor, a directional valve, an indoor heat exchanger, an expansion device, and an outdoor heat exchanger;
    a pre-heater to pre-heat outdoor air blown toward the outdoor heat exchanger during a heating operation of the heat pump type air conditioner;
    an auxiliary evaporator to evaporate a refrigerant emerging from the outdoor heat exchanger during the heating operation of the heat pump type air conditioner; and
    waste heat recovering means to transfer waste heat of the engine to at least one of the pre-heater and the auxiliary evaporator.

2. The cogeneration system according to claim 1, wherein the heat pump type air conditioner uses the electricity generated from the generator.

3. The cogeneration system according to claim 1, wherein at least one of the engine, the generator, the compressor, the directional valve, the indoor heat exchanger, the expansion device, and the outdoor heat exchanger comprises a plurality of ones.

4. The cogeneration system according to claim 1, wherein the waste heat recovering means comprises:
    an engine-cooling heat exchanger to absorb heat from cooling water used to cool the engine;
    an exhaust gas heat exchanger to absorb heat from exhaust gas discharged from the engine; and
    heat transfer means to transfer at least one of the heat of the engine-cooling heat exchanger and the heat of the exhaust gas heat exchanger to at least one of the pre-heater and the auxiliary evaporator.

5. The cogeneration system according to claim 4, wherein the heat transfer means comprises:
    a pre-heater circulation conduit to guide a heat medium to be circulated around the engine-cooling heat exchanger, the exhaust gas heat exchanger, and the pre-heater;
    an auxiliary evaporator circulation conduit to guide the heat medium to be circulated around the engine-cooling heat exchanger, the exhaust gas heat exchanger, and the auxiliary evaporator; and
    a heat medium circulation pump to pump the heat medium for circulation of the heat medium.

6. The cogeneration system according to claim 5, wherein the auxiliary evaporator circulation conduit is branched from the pre-heater circulation conduit upstream from the pre-heater such that the auxiliary evaporator circulation conduit is bypassed through the auxiliary evaporator, and is joined to the pre-heater circulation conduit downstream from the pre-heater.

7. The cogeneration system according to claim 6, wherein the heat transfer means further comprises a control valve to control the amount of the heat medium circulated through the pre-heater circulation conduit and the auxiliary evaporator circulation conduit.

8. The cogeneration system according to claim 7, wherein:
    the heat transfer means further comprises an outdoor temperature sensor to measure an outdoor temperature or a temperature of the outdoor heat exchanger;
    the control valve is controlled to operate in a pre-heater circulation mode when the heat pump type air conditioner operates in a heating mode, and the temperature measured by the temperature sensor is in a heavily frosting temperature range;
    the control valve is controlled to operate in an auxiliary evaporator circulation mode when the heat pump type air conditioner operates in the heating mode, and the temperature measured by the temperature sensor is in a non-frosting temperature range; and
    the control valve is controlled to operate in a common mode when the heat pump type air conditioner operates in the heating mode, and the temperature measured by the temperature sensor is in a lightly frosting temperature range.

9. The cogeneration system according to claim 5, wherein:
    the cogeneration system further comprises a radiator to discharge heat; and the heat transfer means transfers the heat of the engine-cooling heat exchanger to the radiator when the heat pump type air conditioner operates in a cooling mode.

10. The cogeneration system according to claim 9, wherein the heat transfer means further comprises a radiator circulation conduit to guide the heat medium to be circulated around the engine-cooling heat exchanger and the radiator.

11. The cogeneration system according to claim 10, wherein:
the heat medium circulation pump is directly connected to the pre-heater circulation conduit between the engine-cooling heat exchanger and the exhaust gas heat exchanger; and
the radiator circulation conduit is branched from the pre-heater circulation conduit between the heat medium circulation pump and the exhaust gas heat exchanger such that the radiator circulation conduit is bypassed through the radiator heat exchanger, and is joined to the pre-heater circulation conduit upstream from the engine-cooling heat exchanger.

12. The cogeneration system according to claim 11, wherein the heat transfer means further comprises:
a first valve arranged at a branching region where the radiator circulation conduit is branched from the pre-heater circulation conduit, to alternately open/close the pre-heater circulation conduit and the radiator circulation conduit; and
a second valve arranged at a joining region where the radiator circulation conduit is joined to the pre-heater circulation conduit, to alternately open/close the pre-heater circulation conduit and the radiator circulation conduit.

13. The cogeneration system according to claim 12, wherein:
the first and second valves operate, during the heating operation of the heat pump type air conditioner, in a pre-heater circulation mode to open the pre-heater circulation conduit and to close the radiator circulation conduit; and
the first and second valves operate, during the cooling operation of the heat pump type air conditioner, in a radiator circulation mode to close the pre-heater circulation conduit and to open the radiator circulation conduit.

14. A cogeneration system comprising:
an engine;
a generator connected to an output shaft of the engine to generate electricity;
a heat pump type air conditioner including a compressor, a directional valve, an indoor heat exchanger, an expansion device, and an outdoor heat exchanger;
a pre-heater to pre-heat outdoor air blown toward the outdoor heat exchanger during a heating operation of the heat pump type air conditioner;
an auxiliary evaporator to evaporate a refrigerant emerging from the outdoor heat exchanger during the heating operation of the heat pump type air conditioner; and
waste heat recovering means to transfer waste heat of the engine to at least one of the pre-heater and the auxiliary evaporator while controlling the amount of the transferred heat in accordance with a frosting condition of the outdoor heat exchanger.

15. The cogeneration system according to claim 14, wherein the heat pump type air conditioner uses the electricity generated from the generator.

16. The cogeneration system according to claim 14, wherein at least one of the engine, the generator, the compressor, the directional valve, the indoor heat exchanger, the expansion device, and the outdoor heat exchanger comprises a plurality of ones.

17. The cogeneration system according to claim 14, wherein the waste heat recovering means comprises:
an engine-cooling heat exchanger to absorb heat from cooling water used to cool the engine;
an exhaust gas heat exchanger to absorb heat from exhaust gas discharged from the engine; and
heat transfer means to transfer at least one of the heat of the engine-cooling heat exchanger and the heat of the exhaust gas heat exchanger to at least one of the pre-heater and the auxiliary evaporator.

18. The cogeneration system according to claim 17, wherein:
the heat transfer means transfers at least one of the heat of the engine-cooling heat exchanger and the heat of the exhaust gas heat exchanger to the pre-heater when the heat pump type air conditioner operates in a heating mode, and the outdoor heat exchanger is under a heavily frosting condition;
the heat transfer means transfers at least one of the heat of the engine-cooling heat exchanger and the heat of the exhaust gas heat exchanger to the auxiliary evaporator when the heat pump type air conditioner operates in a heating mode, and the outdoor heat exchanger is under a non-frosting condition; and
the heat transfer means transfers at least one of the heat of the engine-cooling heat exchanger and the heat of the exhaust gas heat exchanger to both the pre-heater and the auxiliary evaporator when the heat pump type air conditioner operates in a heating mode, and the outdoor heat exchanger is under a lightly frosting condition.

19. A method for controlling a cogeneration system, comprising:
a temperature measuring step of measuring an outdoor temperature or a temperature of an outdoor heat exchanger included in a heat pump type air conditioner; and
a waste heat controlling step comprising steps of
supplying waste heat of an engine to a pre-heater adapted to pre-heat air blown to the outdoor heat exchanger when the heat pump type air conditioner operates in a heating mode, and the temperature measured in the temperature measuring step is in a heavily frosting temperature range,
supplying the waste heat of the engine to a compressor suction line heater adapted to heat a suction line of a compressor included in the heat pump type air conditioner when the heat pump type air conditioner operates in the heating mode, and the temperature measured in the temperature measuring step is in a non-frosting temperature range, and
supplying the waste heat of the engine to both the pre-heater and the compressor suction line heater when the heat pump type air conditioner operates in the heating mode, and the temperature measured in the temperature measuring step is in a lightly frosting temperature range.

20. The method according to claim 19, wherein the waste heat controlling step further comprises the step of supplying, to the radiator, waste heat of cooling water used to cool the engine, which is included in the waste heat of the engine, when the heat pump type air conditioner operates in a cooling mode.

* * * * *